United States Patent [19]

Tufts

[11] 4,054,519
[45] Oct. 18, 1977

[54] HYDRAULIC ATTRITION UNIT FOR MARINE TOILET

[75] Inventor: Wesley M. Tufts, Holliston, Mass.

[73] Assignee: Nautron Corporation, Braintree, Mass.

[21] Appl. No.: 610,097

[22] Filed: Sept. 4, 1975

[51] Int. Cl.² .......................................... C02C 1/18
[52] U.S. Cl. .................................. 210/104; 210/139;
210/152; 210/208; 241/46.17
[58] Field of Search .............. 4/10, 69, 77, 78, 90,
4/115; 21/103; 210/62, 86, 89, 98, 100, 101,
104, 139, 152, 206, 208; 241/46.11, 46.17;
259/8, 23, 43, 122

[56] References Cited

U.S. PATENT DOCUMENTS

| 2,840,355 | 6/1958 | Stratford | 259/8 |
|---|---|---|---|
| 3,044,077 | 7/1962 | Belden | 210/62 X |
| 3,228,036 | 1/1966 | Zaske et al. | 4/77 |
| 3,587,116 | 6/1971 | Quase | 4/10 |
| 3,638,917 | 2/1972 | Osten | 259/8 |
| 3,713,177 | 1/1973 | Tufts et al. | 4/10 X |
| 3,762,553 | 10/1973 | Russo | 210/152 |
| 3,844,946 | 10/1974 | Farrell, Jr. | 210/104 |
| 3,846,847 | 11/1974 | Tufts et al. | 4/10 X |
| 3,852,193 | 12/1974 | Jakubek et al. | 210/104 X |
| 3,875,057 | 4/1975 | Kaelin | 210/104 |

FOREIGN PATENT DOCUMENTS

142,451  3/1935  Austria ........................ 241/46.17

Primary Examiner—John Adee
Attorney, Agent, or Firm—Dike, Bronstein, Roberts, Cushman & Pfund

[57] ABSTRACT

Apparatus designed to be interposed between the discharge of a marine toilet and the overboard discharge line of a vessel comprising a treating chamber provided with inlet and discharge openings through which the effluent is delivered to the chamber for treatment and pumped therefrom following treatment, an impeller supported in the chamber for rotation therein which, in conjunction with the hemi-toroidal formation of the chamber, produces vortexlike movement of the effluent which reduces the particle size by hydraulic attrition and mixes it with chemicals deposited therein, a dispenser for depositing the chemicals in the chamber, a pump for introducing flush water to the chamber, a pump for discharging the treated effluent and the flush water and controls for timing the cycle of operation from the time it is initiated by flushing the toilet until it is timed out by a timer in the control circuit, together with suitable indicators for indicating the condition of the apparatus at any given time, and to prevent operation in the event that the chemicals are depleted.

5 Claims, 13 Drawing Figures

HYDRAULIC ATTRITION UNIT FOR MARINE TOILET

BACKGROUND OF INVENTION

Recently in the interest of pollution control the Federal Government has issued regulations for the design and performance of sanitary equipment, specifically, marine toilets aboard commercial and pleasure craft of all kinds. In design the equipment is of the thru flow type as opposed to holding tank systems formerly used to provide for chemical treatment before the discharge or to hold the effluent until such time as the vessel can discharge into a dockside receiving facility. For such flow thru equipment the regulations are that the effluent be treated on the way from the toilet to the overboard discharge line in such a way as to render the coliform count to not more than 240 per 100 milliliters. The apparatus herein disclosed is designed to replace holding tanks in such vessels as still have such equipment aboard and to be interposed between the toilet and the overboard line in such vessels as have direct discharge without holding tanks to enable rendering the effluent flushed from a manually operated or electrically operated toilet within the limits imposed by the recently adopted regulations, and further, to provide equipment for this purpose which can be easily installed, is not influenced by the motion of the vessel and/or vibrations, is automatically rendered inoperative in the absence of chemicals employed for the treatment, requires a very low source of electric power for its operation and is relatively inexpensive.

SUMMARY OF INVENTION

The invention as herein illustrated comprises a hydraulic attrition unit for rendering innocuous effluent delivered thereto from a marine toilet, comprising a chamber containing an opening for receiving the effluent and an opening through which the innocuous effluent is discharged, such chamber having a bottom the interior surface of which is hemi-toroidal, an impeller supported in the chamber for rotation about an axis perpendicular to the bottom and in a plane parallel to the bottom, said impeller in conjunction with the hemi-toroidal surface at the bottom operating to create a vortex-like flow of the effluent in planes perpendicular to the bottom from the underside of the impeller, downwardly, outwardly and upwardly along the hemi-toroidal surface and inwardly toward the center at the upper side of the impeller and simultaneously circularly about the axis of rotation of the impeller so as to produce hydraulic attrition of the solid material in the effluent. The impeller is in the form of a flat disk shaped member supported adjacent the bottom at the center of the chamber in a horizontal plane substantially midway between the bottom of the chamber and the discharge opening for rotation about a vertical axis. Peripherally of the disk there are alternate upwardlly and downwardly projecting deflector fins, the fins preferably being disposed at an angle to the radius of the disk. The hemi-toroidal surface of the chamber is provided with a chemically resistant hard glossy finish such as an epoxy. The cycle of operation is initiated by pushing the flush button of the marine tolet which starts a pump to pump the effluent together with fresh water into the treating chamber and inject a tablet into the chamber. In addition to the treating chamber there is a flushing chamber containing a motor driven induction pump for introducing flush water to the treating chamber and a discharge chamber containing a motor driven discharge pump for discharging the treated effluent to the overboard line. There is float control means within the discharge chamber operable when the level of the liquid in the treating chamber rises to a predetermined level above the discharge opening to stop the toilet flush pump. A dispenser delivers chemical material in the form of tablets to the treating chamber to render the effluent innocuous. The aforesaid float control means operates when the level rises to said predetermined level to actuate switch means operable to start a motor which rotates the impeller. A timer is operable at the end of a predetermined time period following initiation of the operation of the impeller motor to start a flush pump motor to supply a charge of flush water to the chamber, and simultaneously to start a discharge pump to discharge the treated effluent through the discharge chamber overboard and when the level of the mixture in the chamber reaches a predetermined low level as determined by the float control switch means to stop the impeller motor and pump motors and thus complete the cycle. In a manual system a hand pump is employed to pump the effluent and flush water into the treatng chamber until an indicator is lit whereupon the system automatically completes the cycle through the float switch. The tablet dispenser is mounted at the top of the unit for receiving a canister of tablets and for delivering tablets one at a time into the treating chamber. The dispenser is inclined with its lower end adjacent an opening in the treating chamber so that the tablets gravitate toward the opening and there is a solenoid operated ejector for pushing the lowermost tablet through the opening into the treating chamber. There is switch means located adjacent the lower end of the dispenser operable by movement of the last of a predetermined number of tablets beyond it toward the opening into the treating chamber to signal the depletion and a switch means in the opening to the treating chamber for disabling the unit when the dispenser is empty until a new canister of tablets is provided. The low level float switch is located at the level of the discharge opening from the treating chamber so as to maintain a quantity of fluid in the treating chamber at all times. If there is need for it a macerator may be interposed between the toilet and the unit.

The invention will now be described in greater detail with reference to the accompanying drawings wherein.

Figures 1, 5:
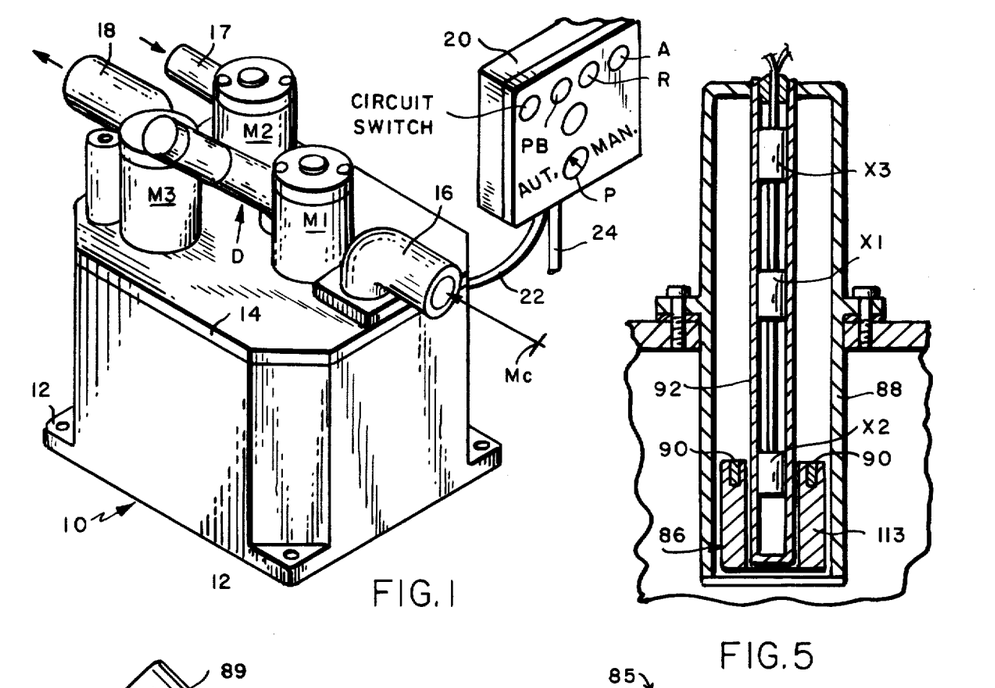
FIG. 1 is an isometric of the unit, diagrammatically depicting the flow through the device.
FIG. 5 is an enlarged fragmentary section showing the float control means for cycling the apparatus.
Figure 2:
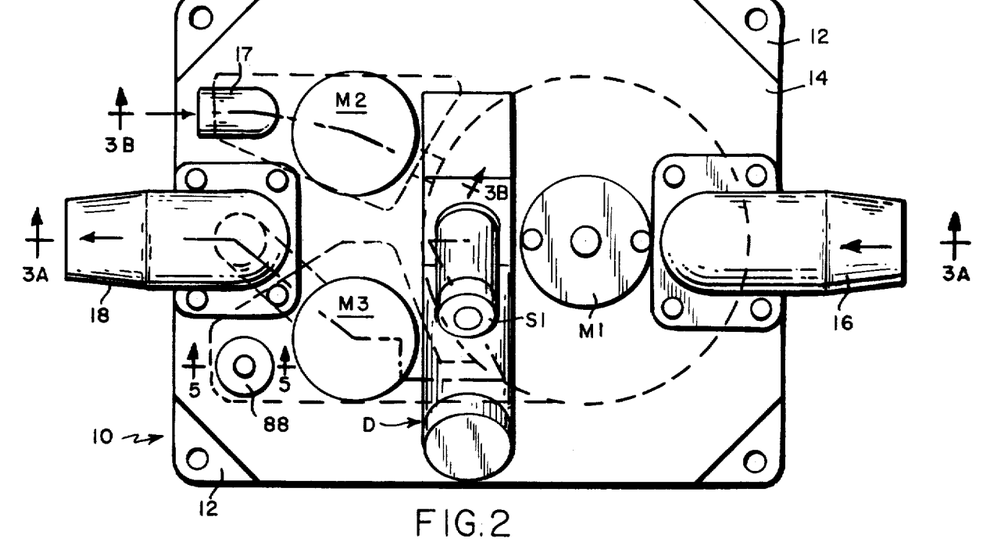
FIG. 2 is a top view of FIG. 1.

Referring to the drawings, FIG. 1, the unit is contained in a box shaped structure 10 recessed at its four corners to provide flanges 12 at the bottom containing holes for receiving bolts by means of which the unit may be bolted to structure in the vessel. At the top of the structure there is a removable cover 14, on which there are mounted an impeller motor M-1, a flush pump motor M-2, a discharge pump motor M-3, a dispenser D and a solenoid S-1. Additionally, there are mounted on the cover an intake coupling 16 through which effluent from the toilet enters the unit, an intake coupling 17 through which flush water is introduced into the unit and a discharge coupling 18 through which the innocuous effluent is discharged from the unit into the overboard line. A control box 20 is illustrated connected to the back of the unit by cable 22 and to an electric power source by cable 24.

Figure 3A:
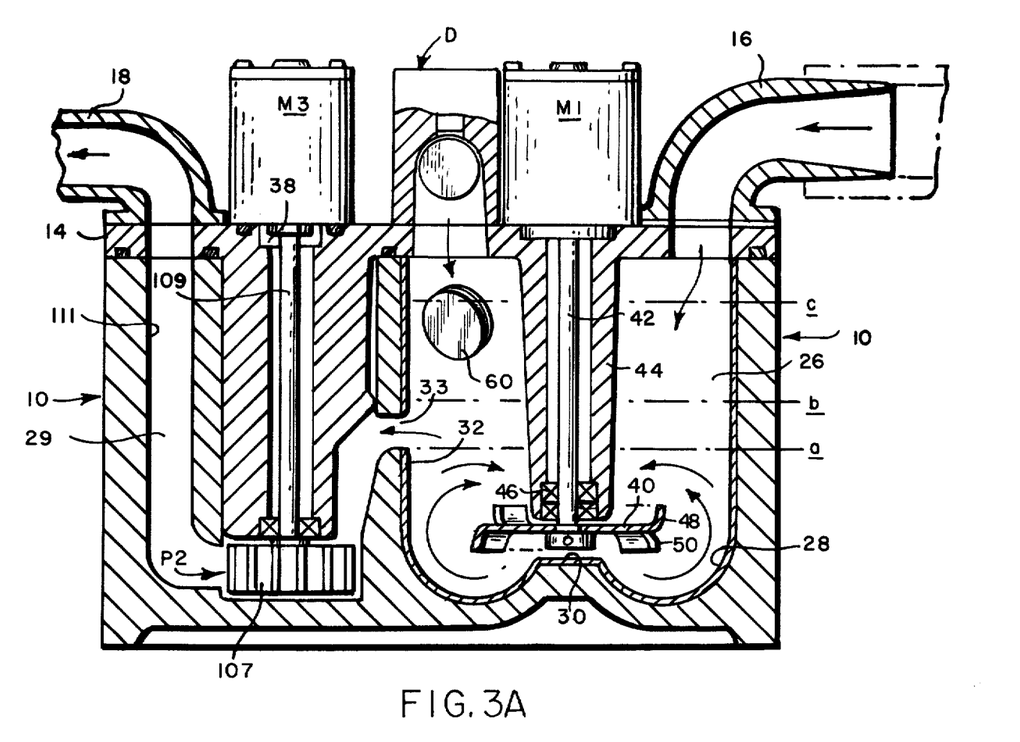
FIG. 3A is a section taken on the line $3^A$—$3^A$ of FIG. 2.

Referring specifically to FIG. 3A which shows the unit in section, the structure embodies a cylindrical treating chamber 26. The interior of the treating chamber at the bottom is hemitoroidal in shape of comprising an annular downwardly concave surface 28 at the center of which is an elevated island 30. The hemitoroidal bottom surface 28 is concentric with respect to the center of the island 30 and the entire interior surface of the chamber is treated to provide a very smooth frictionless surface to reduce friction to a minimum by the application of a coating 32 of epoxy resin to the surface. The entire unit is comprised, for example, of fiberglass or aluminum.

In the treating chamber 26 the effluent is reduced to particle size such as to pass through U.S. Sieve No. 12 mesh screen by hydraulic attrition and exposed to the action of chemicals which render the effluent innocuous. The chemicals are delivered to the chamber from the dispenser D, as will appear hereinafter, substantially simultaneously with the discharge of the effluent from the toilet into the chamber. In addition to the treating chamber 26 there is a flush water chamber 27, FIG. 3B, within which there is mounted an induction pump P-1 and a discharge chamber 29, FIG. 3A, within which is mounted a discharge pump P-2. The flush water chamber 27 has an opening 31 near the top in communication with the treating chamber and the discharge chamber has an opening 33 intermediate the top and bottom in communication with the treating chamber.

Figure 4:
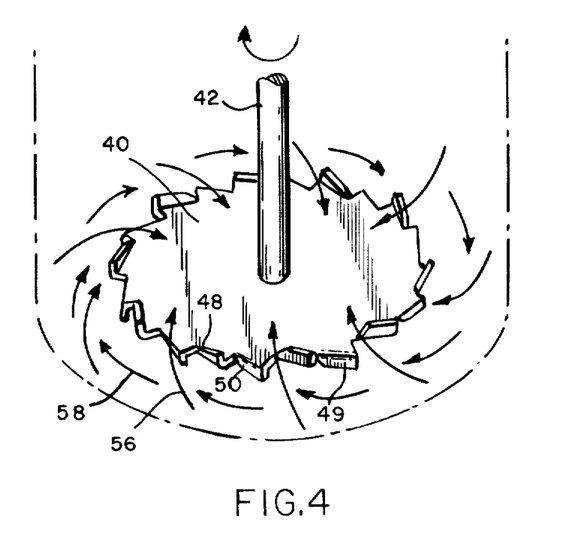
FIG. 4 is an isometric diagrammatically illustrating the flow produced by the impeller.
Figure 8:
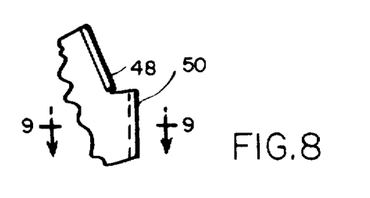
FIG. 8 is a fragmentary plan view of the impeller blade showing the two fins, one bent up and the other bent down.

The means for producing hydraulic attrition of the solid particles of effluent within the treating chamber 26 comprises a flat circular disk 40, FIGS. 3A, 4 and 8, fixed to the lower end of a shaft 42 which extends downwardly from the motor M-1. The shaft 42 extends through a sleeve 44 formed integral with the underside of the cover 14 so as to be at the center of the chamber 26, the lower end of which contains shaft bearings 46—46 through which the shaft extends to a position just above the island 30. The impeller disk 40 is fastened to the shaft so as to rotate in a plane substantially midway between the bottom of the chamber and the level of the opening 33 in the discharge chamber, thus, the impeller disk is always submerged in a body of fluid at the bottom of the treating chamber.

Figure 7:
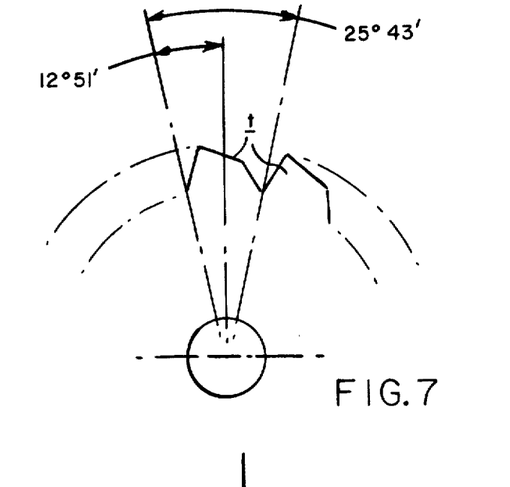
FIG. 7 is a plan view of the impeller blank showing the fins prior to bending.
Figure 9:
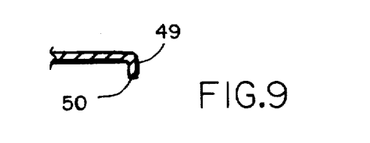
FIG. 9 is a section taken on the line 9—9 of FIG. 8.

The impeller disk 40 as illustrated in FIGS. 3A, 4, 8 and 9 is uniformly flat, has a pitch diameter of 3.620 inches and at its peripheral edge deflector fins 48 and 50, which alternately extend upwardly and downwardly at right angles to the plane of the disk. The deflector fins have working surfaces 49 which in planes perpendicular to the plane of the disk are approximately 0.106 inches in width, that is, perpendicular to the disk and approximately 0.632 inches in length and are inclined toward the center of rotation of the disk in the direction of rotation at an angle of approximately 20°. The impeller disk is formed from a blank such as shown in FIG. 7 by bending tooth-like segments $t$ alternately up and down at substantially right angles to the plane of the disk as shown in FIG. 9. There are 14 deflector fins in all, although the number of fins may be varied depending upon the diameter of the disk and the speed of rotation. As thus constructed, rotation of the impeller disk produces a vortex-like movement or circulation, FIGS. 3A and 4, of the effluent in the chamber in which the solid particles move in circular paths in planes perpendicular to the impeller as shown by the arrows 56, from the underside of the impeller downwardly along the bottom of the chamber, outwardly, upwardly, inwardly towards the center of rotation of the impeller and downwardly onto the upper side of the impeller and at the same time circularly about the axis of rotation of the impeller as illustrated by the arrows 58. The movement is vortex-like and produces hydraulic attrition of the solid particles of the effluent by creating repeated impact of the particles with each other. Using an impeller such as described above and rotating it at 3000 rpm will reduce the most difficulty reduceable effluent expected to be encountered to a particulate size in the order of one-sixteenth inches so as to pass U.S. Sieve No. 12 mesh screen within a time period of 2 to 5 minutes which is compatible with the time period which would normally be required to provide for normal use of the toilet. The reduction of the solid material is provided by attrition (repeated collision of the particles with each other) as contrasted to maceration which depends upon cutting and shredding the particles to reduce their size.

As stated above, the effluent while being reduced in particle size in the chamber 26 is subjected to the action of chemicals to render it innocuous. Reduction to a uniform particle size of approximately one-sixteenth inches is desirable to assure that the chemicals reach every portion of the particles being treated. The chemicals used in the unit are in tablet form, one of which is shown as 60 in FIG. 3A and is comprised of a composition of 9 grams of calcium hypochlorite with 3 grams of calcium carbonate compressed to provide a tablet which is approximately 1.625 inches in diameter and 0.180 to 0.200 inches thick, beveled at its edges. In a unit in which the treating chamber has an inside volume capacity of 4 quarts, filled to a level of 3 to 3¼ quarts, treatment for a period of 2 to 5 minutes with a single tablet will render the coliform count 0 per 100 milliliters of effluent. The government regulations require that the fecal coliform bacteria count shall not be greater than 1000/100 milliliters of effluent and the apparatus as herein described reduces a coliform count well below that requirement.

Figures 6, 10:
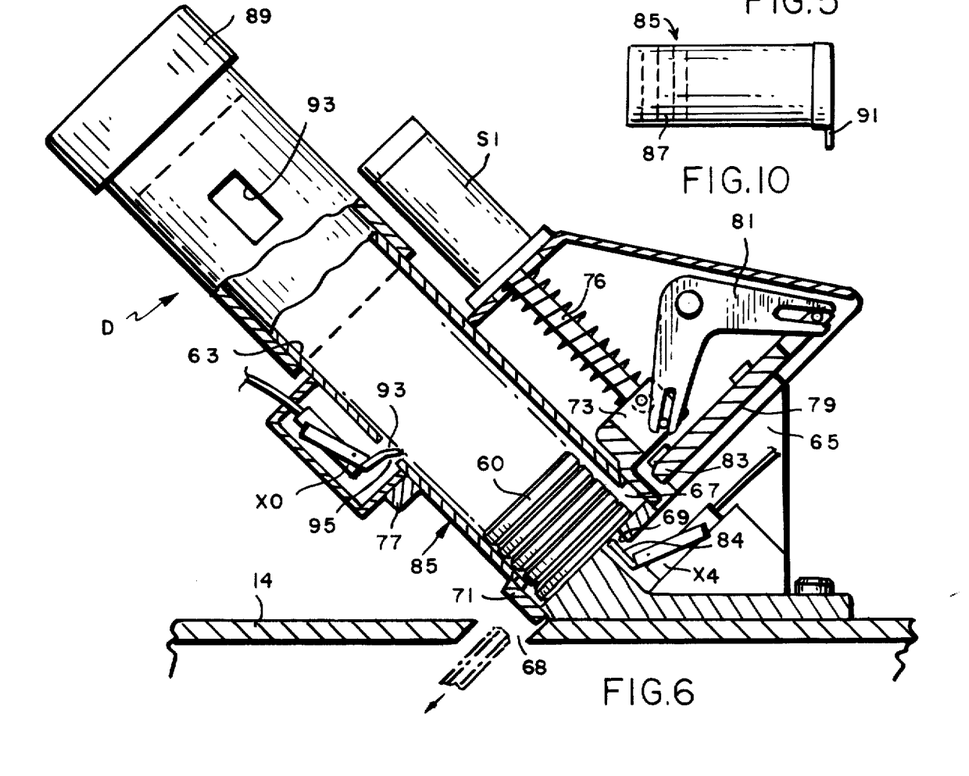
FIG. 6 is a fragmentary section to larger scale showing the dispenser mounted at the top of the structure.
FIG. 10 is an elevation of the tablet canister.

The tablets 60 are delivered into the treating chamber 26 from the dispenser D which, as shown in FIG. 6, comprises an inclined chamber 63 supported at its lower end on the cover 14 by a bracket member 65. At the lower end of the dispenser there is a diametrical opening 67, the lower side of which is directly above an opening 68 in the cover 14. A sleeve 71 is slidingly mounted on the chamber over the opening 67 and there is means operable by the aforesaid solenoid S-1 to move the sleeve to a position to uncover the opening 67 and also to thrust a tablet at the bottom of the dispenser chamber through the lower side of the opening 67 and through the opening 68 into the treating chamber. The sleeve is retracted to uncover the opening by an angle member 73, one arm of which is fixed to the sleeve and the other arm of which is yieldingly mounted to the plunger 76 of the solenoid S-1. A stop 77 mounted on the side of the dispenser chamber limits the retraction of the sleeve. The tablets are thrust through the lower side of the opening 67 by an ejector 79 supported for reciprocal movement through the upper side of the opening 67 and actuated by a rocker 81 connected to the plunger 76. Actuation of the solenoid first retracts the sleeve and then thrusts the ejector into the upper side of the opening against the lowermost tablet. In order to lift the weight of the successive tablets from the lowermost tablet the ejector is made slightly thicker than the tablets and has a bevel 83 at its end which will lift the tablets above the lowermost tablet off the lowermost tablet so that it will slide freely through the lower side of the opening 67 into the treating chamber. The upper end of the dispenser chamber is open for receiving a canister 85 as shown in FIG. 10, comprising a hollow plastic cylinder 87 closed at its top and at its bottom by a tear strip 91. The canister is pre-loaded with tablets by the manufacturer. The canister is slipped into the dispenser chamber and the latter contains near its upper end an opening 93 through which the tear strip can be grasped as the canister is lowerred into the dispenser chamber and removed. All the tablets slide down into the receiver when the tab is torn off and the canister is removed and thrown away (bottom extent of canister shown in FIG. 6). A switch Xo is mounted on the dispenser chamber with its actuator arm 93 extending through an opening 95 into the dispenser chamber at a position such that when the last of 6 tablets at the lower end of the chamber passes the actuator arm it will operate the switch so as to signal the near depletion of tablets. The sleeve as related above normally covers the opening 67 and so prevents moisture from reaching these tablets which are somewhat deliquescent and would tend to disintegrate through long exposure to moisture. A cap 89 is fitted to the open upper end of the dispenser chamber.

Figure 3B:
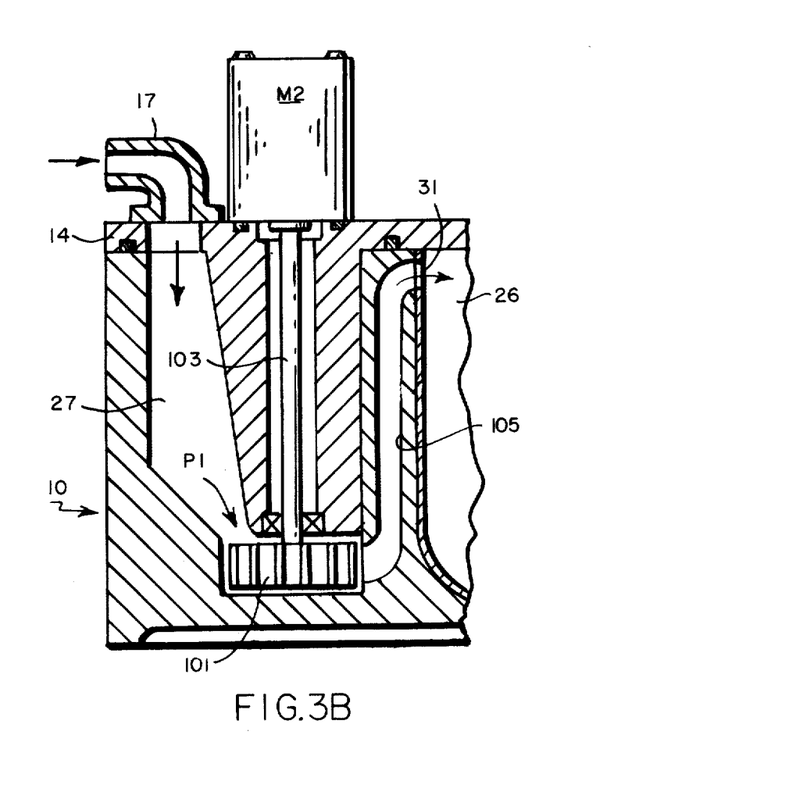
FIG. 3B is a section taken on the line $3^B$—$3^B$ of FIG. 2.

Following hydraulic attrition of the solid matter in the effluent brought about by the impeller disk and action of the chemicals the flush water is drawn into the flush water chamber and pumped from thence into the treating chamber and simultaneously the mixture of effluent and flush water in the treating chamber is drawn into the discharge chamber and pumped from thence to the overboard line and while this is taking place the impeller continues to be rotated. The flush pump P-1, FIG. 3B, is mounted in the flush chamber and comprises an impeller 101 fixed to the lower end of a shaft 103 which extends downwardly from the motor M-2. The intake side of the pump P-1 is connected with the intake coupling 17 and the outlet side by way of the line 105, connected to the opening 31, is in communication with the treating chamber 26. The discharge pump P-2, FIG. 3A, is mounted in the discharge chamber and comprises an impeller 107 affixed to the lower end of a shaft 109 which extends downwadly from the motor M-3. The intake side of the pump P-2 is in communication with the discharge chamber and the outlet side by way of the line 111 is in communication with the discharge coupling 18.

The apparatus, as has been previously stated, is especially designed to be used in conjunction with marine toilet equipment that has been in use for some time such as direct discharge systems, the operation of which flushes the effluent overboard without treatment of any kind and the holding tank type of equipment wherein the effluent is temporarily held within a holding tank for later discharge or for treatment and later discharge. In this latter type of apparatus the unit would replace the holding tank.

Figure 11:
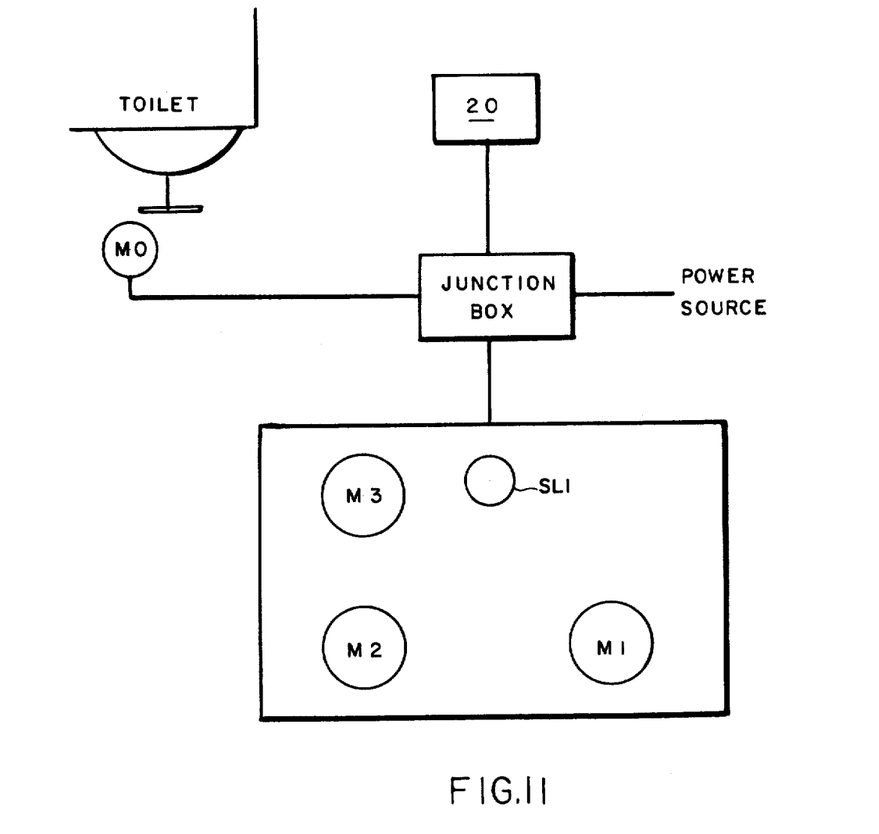
FIG. 11 is a block diagram of the control.
Figure 12:
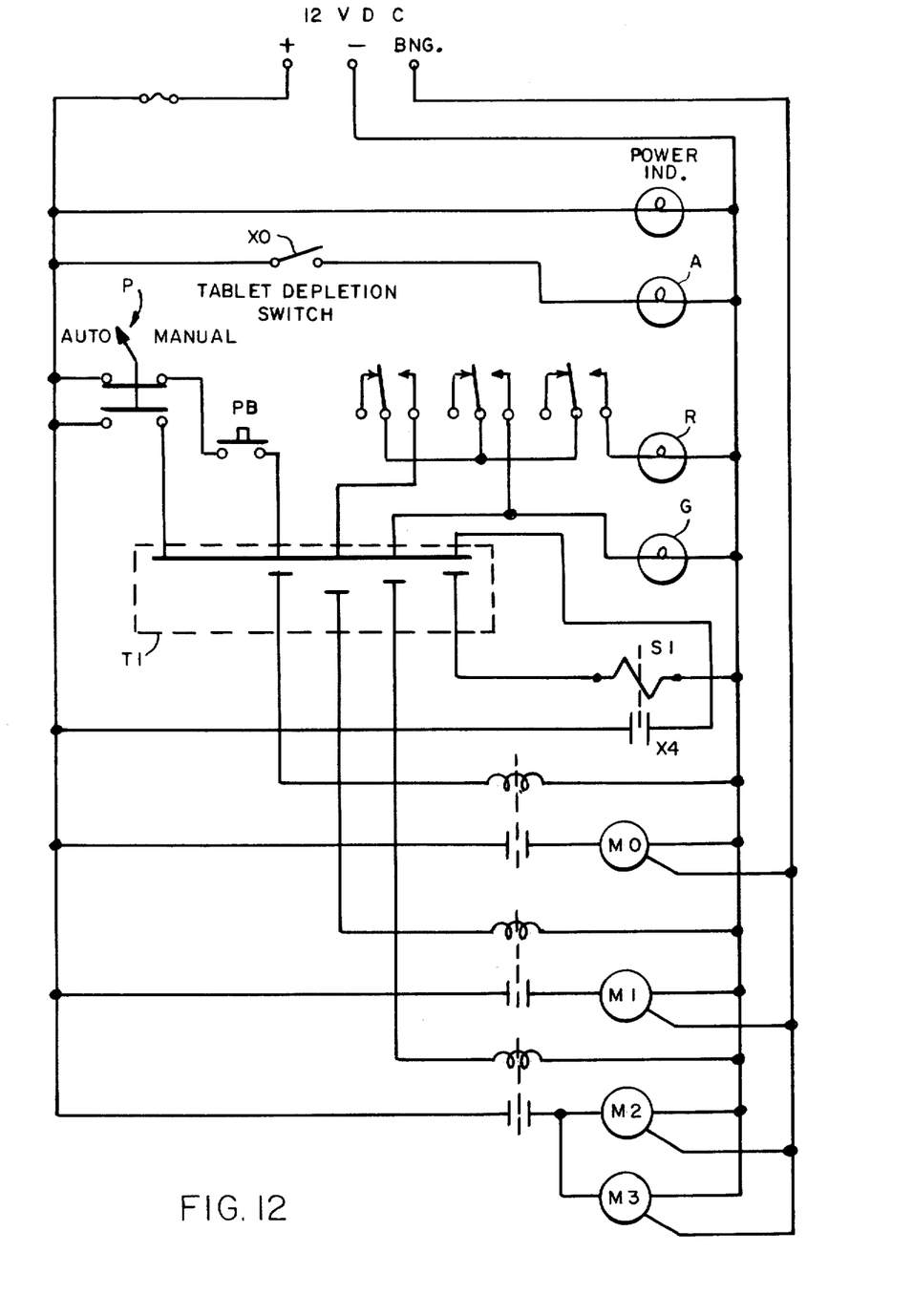
FIG. 12 is a line diagram of the control circuit.

The controls for initiating and terminating a cycle of operation are shown in FIGS. 11 and 12. Automatic operation is provided for by pressing a toggle switch P which when shifted to the left as illustrated in FIG. 12 positions the system for automatic operation and assuming that the toggle switch P is in the automatic position pushing the toilet flush button PB, FIG. 12, flushes the toilet by starting the motor M-O of the toilet flush pump, FIG. 11, which pumps water into the toilet bowl and from thence into the treating chamber to flush the effluent together with the flush water into the treating chamber 26 through the coupling 16, simultaneously the flush button PB energizes the solenoid S-1. As already stated, there is fluid in the treating chamber 26 at the level $a$ of the discharge opening 33. The fluid containing the effluent which is discharged from the toilet by flushing raises the level of the mixture in the treating chamber from the level $a$, FIG. 3A, which is the level of the discharge opening 33 to approximately the level $b$. At the level $b$ a switch X-1, FIG. 5, is operated which stops the toilet motor M-O. Energization of the solenoid S-1 retracts the plunger 76 which correspondingly retracts the sleeve 71 and projects the ejector 79 into the opening 67 to eject a tablet from the dispenser downwardly through the lower side of the opening 67 into the treating chamber 26. At the lower end of the chamber there is an opening 69 through which extends the balde 84 of a switch X-4 which completes a circuit to the impeller motor M-1. if there are tablets at the bottom of the chamber ready to be ejected the switch X-4 is held closed so that the impeller motor will be energized upon energization of the solenoid S-1 but if there are no tablets then the switch X-4 will open thus breaking the circuit to the impeller motor so that the system will interlock and will be inoperative until the supply of tablets is replenished. In the circuit there is a timer T-1, FIG. 12, which is pre-set to provide a predetermined decontamination period, and this is started simultaneously with the impeller motor by actuation of the switch X-1. During the decontamnation period a green indicator light G on the control box is illuminated indicating an "in use" condition. At the end of the decontamination period the timer T-1 energizes the flush pump motor M-2 to conduct flush water into the flush chamber and at the same time starts the discharge pump motor M-3 which discharges the treated effluent from the discharge chamber until a float control switch X-2, at the level $a$, stops the cycle by stopping the motors M-1, M-2 and M-3. If the toilet is used prior to the completion of a cycle and the flush button PB is depressed so as to discharge effluent from the toilet into the treating chamber the added effluent and flush water rising to the level $c$ will actuate a switch X-3 which will shut off the toilet motor M-O while permitting the cycle in process to continue to its end. During this period the "full" indicator which is a red indicator light R will be lit. An amber indicator A when lit by the switch X-O indicates the chemical supply is low so as to alert the user to replenish the unit with a new canister of tablets.

When the toilet is manual the toggle switch P is moved to the right hand position as shown in FIG. 12. Operation of the system is then initiated by a hand pump to pump the effluent and flush water into the treating chamber until the green indicator lights up. From this point on the cycle is started and continued automatically as previously described by the float switch X-1, which in this instance starts the cycle instead of shutting off the toilet motor. The depletion interlock is embodied in the manual system as well as in the automatic system.

The switches X-1, X-2 and X-3 are operated by a float 86, FIG. 5, comprised of a cylinder 113 of rigid foam supported within a slush shield 88 mounted in the discharge chamber so that it may rise vertically therein with the rise of the level of the fluid in the treating chamber without being effected by the turbulent movement of the effluent in the treating chamber or by the motion of the vessel. The float has at its upper end encapsulated magnets 90—90. The switches X-1, X-2 and X-3 are encapsulated within a plastic tube 92 fixed in the slush shield 88. The tube 92 provides a guide for the float as it rises or falls with changes in liquid level. These switches are of the reed type and so not effected by vibration or heel. At the level $a$ the switch X-2 is held open and the system is dormant. As the float 86 rises to the level $b$ the magnets 90—90 will close the switch X-1 momentarily which stops the motor M-O of the toilet pump and starts the timer T-1. At the end of a predetermined time the timer simultaneously starts the motor M-2 to supply flush water and the discharge motor M-3 so as to draw in flush water and simultaneously to discharge the mixture from the treating chamber overboard. The discharge pump P-2 is of greater capacity than the induction pump P-1 so that while they operate simultaneously the effluent is discharged at a faster rate than the flush water is induced into the treating chamber.

A solid state timer is used which is designed to be manufactured at a low cost and yet perform all of the cycling, timing and so forth required at a low voltage and for long life.

As illustrated, the motors M-1, M-2 and M-3, the dispenser D and solenoid S-1 and the couplings 16, 17 and 18 are all mounted on the cover 14 so that they may be easily removed as a unit to provide ready access to the chambers 26, 27 and 29 for cleaning and/or for repairs of any of the operating parts.

It is within the scope of the invention to reduce the load on the unit by interposing a conventional macerator Mc between the toilet and the chamber 26 to initially shred and cut up non-effluent material such as toilet paper, kleenex tissues, threads, hair and other miscellaneous material dropped into the toilet.

It should be understood that the present disclosure is for the purpose of illustration only and includes all modifications or improvements which fall within the scope of the appended claims.

I claim:

1. A hydraulic attrition unit for rendering innocuous effluent comprising a treating chamber containing an opening for receiving a predetermined charge of effluent for treatment, an opening through which the treated effluent is discharged, said treating chamber being adapted to confine said predetermined charge of effluent during treatment and having a bottom, the interior surface of which is hemitoroidal, an impeller supported in the treating chamber for rotation about an axis perpendicular to the bottom and in a plane parallel thereto, said impeller having a plurality of flat deflector elements spaced at equal radial distances from the center of rotation of the impeller, at equal peripheral spacing and perpendicular to the plane of rotation, alternate ones of which project upwardly and intermediate ones of which project downwardly, each deflector element presenting an outwardly facing plane surface which diverges outwardly from the pitch circle and a leading end which slopes radially away from the plane of rotation, said impeller in conjunction with the hemitoroidal surface of the bottom operating to create excursory movement of said predetermined charge of effluent within the chamber in planes perpendicular to the bottom and from the underside of the impeller downwardly, outwardly and upwardly along the hemitoroidal surface to the upper side of the impeller and simultaneously circular movement of the entire charge about the axis of rotation of the impeller so as to produce hydraulic attrition of the solid materials in the effluent, said opening through which the treated effluent is discharged being situated in the wall of the chamber above the level of a predetermined charge in said treating chamber so that said predetermined charge of effluent is subjected to repeated excursions before it is discharged.

2. A hydraulic attrition unit for rendering innocuous effluent, comprising a treating chamber containing an opening for receiving an effluent, an opening through which the innocuous effluent is discharged, said treating chamber having a bottom, the interior surface of which is hemitoroidal, an impeller supported in the treating chamber for rotation about an axis perpendicular to the bottom and in a plane parallel thereto, said impeller in conjunction with the hemitoroidal surface at the bottom operating to create movement of the effluent in planes perpendicular to the bottom from the underside of the impeller downwardly, outwardly and upwardly along the hemitoroidal surface to the upper side of the impeller simultaneously circularly about an axis of rotation of the impeller so as to produce hydraulic attrition of the solid material in the effluent, said discharge opening being situated above the impeller such that a predetermined low level of liquid is maintained in the treating chamber at all times, a flush water pump connected to the treating chamber for delivering flush water thereto, a discharge pump connected to the treating chamber for withdrawing the treated mixture from the treating chamber for withdrawing the treated mixture from the treating chamber and control means comprising a control circuit for cycling operation of the apparatus, said control circuit including a timer for determining the length of the decontamination period, means operable by flushing the toilet to initiate a cycle of operation and float control means operable when the level of the liquid rises to a predetermined level above said predetermined low level to start the timer.

3. Apparatus according to claim 2, wherein the discharge pump has a higher discharge capacity than the capacity of the induction pump so that the treated effluent is discharged at a faster rate than the flush water is induced.

4. A hydraulic attrition unit arranged to be interposed between the discharge side of a marine toilet and the overboard discharge line of a vessel comprising a treating chamber having an inlet opening connected to the discharge side of the toilet so as to receive effluent therefrom when the toilet is flushed and a discharge opening connected to the overboard discharge line of the vessel for discharging the treated effluent from the vessel, said discharge opening being situated above the bottom of the chamber at such a level as to maintain a predetermined low level of liquid at the bottom of the treating chamber, impeller means supported at the bottom of the treating chamber intermediate the bottom and said predetermined low level of the liquid, said bottom being internally contoured in conjunction with the impeller means to promote circular flow of the effluent in perpendicular planes and simultaneously promote circular flow about the center of the chamber to cause recurrent impact of the particles with each other such as to cause hydraulic attrition of the particles, an induction pump for supplying flush water to the treating chamber, a discharge pump for discharging the treated effluent from the treating chamber, a timer device operable when the impeller has rotated a predetermined length of time to simultaneously initiate operation of the induction pump and discharge pump and means for effecting operation of the impeller when a charge of effluent is delivered to the treating chamber.

5. A hydraulic attrition unit for rendering innocuous effluent flushed from a toilet comprising a treating chamber, conductor means connected to the toilet and to the unit for delivering a flushing of effluent to the treating chamber, said treating chamber being of a capacity to receive at least one flushing and to contain said flushing in isolation during treatment, said treating chamber having a bottom, the surface of which is hemitoroidal, a flat disk-shaped impeller supported in the chamber adjacent the bottom in concentric relation to said hemitoroidal surface which, in conjunction with said hemitoroidal surface, produces within the chamber flow circularly in vertical planes downwardly from the underside of the impeller, outwardly and upwardly to the top side thereof and simultaneously circular movement of the entire charge about the axis of rotation so as to produce hydraulic attrition of the solid material, said impeller disk having a plurality of flat deflector elements spaced at equal radial distances from the center of rotation of the impeller, at equal peripheral spacing and perpendicular to the plane of rotation, alternate ones of which project upwardly and intermediate ones of which project downwardly, each deflector element presenting an outwardly facing plane surface which diverges outwardly from the pitch circle and a leading end which slopes radially away from the plane of rotation, a motor-driven pump, conductor means connecting the motor-driven pump to the chamber for removing the treated effluent following treatment, a motor for driving the macerator, means for starting the macerator motor upon flushing of the effluent into the treating chamber, means for effecting operation of the macerator motor for a predetermined length of time and means for starting the pump motor at the termination of the operation of the macerator motor.

* * * * *